United States Patent
Handa et al.

(10) Patent No.: US 8,595,813 B2
(45) Date of Patent: Nov. 26, 2013

(54) IC CARD FOR ENCRYPTION OR DECRYPTION PROCESS AND ENCRYPTED COMMUNICATION SYSTEM AND ENCRYPTED COMMUNICATION METHOD USING THE SAME

(75) Inventors: Fukio Handa, Tokyo (JP); Yoshihiro Yano, Tokyo (JP); Takayuki Chikada, Tokyo (JP); Syouzou Niwata, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 13/098,171

(22) Filed: Apr. 29, 2011

(65) Prior Publication Data

US 2011/0213973 A1 Sep. 1, 2011

Related U.S. Application Data

(62) Division of application No. 11/579,079, filed as application No. PCT/JP2005/008657 on May 2, 2005, now abandoned.

(30) Foreign Application Priority Data

May 6, 2004 (JP) ................................. 2004-137193

(51) Int. Cl.
*G06F 21/00* (2013.01)
(52) U.S. Cl.
USPC .......................................................... 726/9
(58) Field of Classification Search
USPC ............................. 726/9, 20, 21, 4
See application file for complete search history.

(56) References Cited

U.S. PATENT DOCUMENTS 5,065,429 A 11/1991 Lang
5,227,613 A 7/1993 Takagi et al.

(Continued)

FOREIGN PATENT DOCUMENTS

| JP | 1-233851 A | 9/1989 |
|---|---|---|
| JP | 5-68033 A | 3/1993 |
| JP | 9-106445 A | 4/1997 |
| JP | 10-327142 A | 12/1998 |

OTHER PUBLICATIONS

Espacenet English abstract of JP 10-327142 A.
Espacenet English abstract of JP 5-68033 A.

(Continued)

*Primary Examiner* — Brandon Hoffman
*Assistant Examiner* — Anthony Brown
(74) *Attorney, Agent, or Firm* — Ladas & Parry LLP

(57) ABSTRACT

It is possible to perform encrypted communication between members of a group while assuring a sufficient security compatible with a change of the members. An IC card having the same fixed code F(a) is distributed to all the staffs of company A. When communication is performed between a staff α and a staff β belonging to the same project group, α of the transmission side writes an arbitrary variable code V(1) in the IC card (100a) so as to generate encryption key information K(a1) according to F(a) and V(1) in the IC card and encrypt data D1 by using K(a1). β of the reception side writes the variable code V(1) received from α in the IC card (100b) so as to generate encryption key information K(a1). By using this K(a1), the encrypted data D2 received is decrypted to obtain data D3. The fixed code F(a) is different for each of the companies and rewrite-disabled so as to assure security.

10 Claims, 4 Drawing Sheets

(56) References Cited

U.S. PATENT DOCUMENTS

| | | |
|---|---|---|
| 5,559,887 A | 9/1996 | Davis et al. |
| 5,937,068 A * | 8/1999 | Audebert ............... 713/185 |
| 6,058,477 A | 5/2000 | Kusakabe et al. |
| 6,588,672 B1 | 7/2003 | Usami |
| 6,938,020 B2 | 8/2005 | Nakayama |
| 7,093,128 B2 | 8/2006 | Asano et al. |
| 2002/0016913 A1 | 2/2002 | Wheeler et al. |
| 2002/0062447 A1* | 5/2002 | King et al. ............ 713/200 |
| 2002/0184434 A1* | 12/2002 | Kawaura ............... 711/102 |
| 2003/0105969 A1* | 6/2003 | Matsui et al. ........... 713/194 |
| 2004/0006536 A1 | 1/2004 | Kawashima et al. |
| 2004/0177215 A1 | 9/2004 | Nagamasa et al. |
| 2007/0165860 A1 | 7/2007 | Handa et al. |

OTHER PUBLICATIONS

Espacenet English abstract of JP 1-233851 A.
Espacenet English abstract of JP 9-106445 A.

* cited by examiner

KEY TABLE

ENCRYPTION KEY
(IN THE CASE OF USING EIGHT BYTES FROM THE SEVENTH BYTE ONWARD)

IC CARD FOR ENCRYPTION OR DECRYPTION PROCESS AND ENCRYPTED COMMUNICATION SYSTEM AND ENCRYPTED COMMUNICATION METHOD USING THE SAME

RELATED APPLICATION

This application is a divisional of application Ser. No. 11/579,079 filed on Oct. 30, 2006 now abandoned, which is an application under 35 U.S.C. 371 of International Application No. PCT/JP2005/008657 filed on May 2, 2005, the entire contents of which are incorporated herein by reference.

TECHNICAL FIELD

The present invention relates to an encrypted communication system and an encrypted communication method, and particularly relates to arts of performing encrypted communication using an IC card which executes an encryption or a decryption process.

BACKGROUND ART

With the spread of computer networks in recent years, encrypted communication arts have become extremely important and essential. In a general encrypted communication method, data to be subject to transmission is encrypted at a transmitter side and transmitted as encrypted text data to a receiver side, and at the receiver side, the transmitted encrypted text data is decrypted to obtain the original data subject to transmission. Thus to perform encrypted communication between the two sides, in addition to providing means for sending and receiving data, a means for executing an encryption process must be provided at the transmitter side and a means for executing a decryption process must be provided at the receiver side.

As methods of executing such an encryption process or a decryption process, methods using IC cards have come to be noted. Since priorly, IC cards have been used in various applications as portable information recording media of extremely high confidentiality and recently, companies that distribute multifunctional IC cards, serving as company staff ID cards at the same time, to their respective company staff have been increasing. Such a portable information recording medium that provides confidentiality is optimal for use in an encryption process or a decryption process. Often in a general encryption method, a secret encryption key or encryption key table (here, these shall be referred to collectively as "encryption key information") is used as a seed in an encryption algorithm. In an encryption process of converting predetermined plaintext data into encrypted text data, a process using this secret encryption key information is executed. In this case, the secret encryption key information used in the encryption process becomes an essential element for a decryption process of restoring the encrypted text data to plaintext data. That is, the decryption cannot be performed as long as the secret encryption key information is not provided. Thus by storing this secret encryption key information in an IC card, access of the encryption key by an illicit means is made extremely difficult and security of the encrypted text itself can be improved.

Encrypted communication using IC cards can be realized by preparing two IC cards storing the same encryption key information. That is, a transmitter is made to own a first IC card, a receiver is made to own a second IC card, the transmitter performs an encryption process using the encryption key information inside the first IC card, and the receiver performs a decryption process using the encryption key information inside the second IC card. Obviously, by preparing a large number of IC cards, each storing the same encryption key information, and distributing these IC cards to members belonging to a predetermined group, encrypted communication is made possible among the members belonging to the group. Such a system, with which encrypted communication is performed among a large number of members using a plurality of IC cards, has already been proposed.

An encrypted communication system, to start with, is a system, with which encrypted data are transacted in a manner such that deciphering is possible only among members belonging to a predetermined group, and is premised on measures being taken to prevent the deciphering of encrypted data by outsiders not belonging to the group. However, in many cases in a company of comparatively large scale, etc., members belonging to a specific group change frequently.

For example, suppose that a project team, consisting of specific members, is formed in a company to carry out a specific project. In such a case, a situation may arise in which it is desirable for encrypted communication to be performed among just the members of the project team. Obviously in such a case, conventional encrypted communication arts enable encrypted communication of a mode such that deciphering cannot be performed by company staff not involved in the specific project. However, a project team in a company is liable to undergo a change of members frequently through dissolution, joining of groups, addition of new members, leaving of existing members, etc. Thus for practical use, an encrypted communication system that can flexibly accommodate changes of members is required. However, flexibility and security are generally conflicting elements and if flexibility is provided, security is inevitably compromised accordingly.

Thus an object of the present invention is to provide an encrypted communication system and an encrypted communication method that, when encrypted communication is performed among members belonging to a predetermined group, can accommodate flexibly even for changes of members and can yet ensure sufficient security. Another object of the present invention is to provide an IC card that can be used in such an encrypted communication system and encrypted communication method.

DISCLOSURE OF INVENTION (1) The first feature of the present invention resides in an IC card, used for executing an encryption process or a decryption process using unique encryption key information, said IC card comprising a memory, a CPU that executes predetermined processes based on data and programs stored in the memory, and an I/O unit that performs transaction of information with the exterior;

a first storage location, a second storage location, and a third storage location being secured inside said memory;

a predetermined fixed code being stored in advance in said first storage location and arrangements being made so that said fixed code cannot be rewritten;

an arbitrary variable code being enabled to be written from the exterior into said second storage location and arrangements being made so that said variable code can be rewritten; and there being stored in said memory, a key information generating program that performs a computation process based on a predetermined algorithm using the fixed code stored in said first storage location and the variable code stored in said second storage location to generate encryption key information that is determined uniquely according to said two codes and stores the encryption key information in said third storage location, and an encryption and decryption program that executes the encryption process or the decryption process inside the IC card using the encryption key information stored in said third storage location.

(2) The second feature of the present invention resides in an IC card, used for executing an encryption process or a decryption process using unique encryption key information, said IC card comprising, a memory, a CPU that executes predetermined processes based on data and programs stored in the memory, and an I/O unit that performs transaction of information with the exterior;

a first storage location, a second storage location, and a third storage location being secured inside said memory;

a predetermined fixed code being stored in advance in said first storage location and arrangements being made so that said fixed code cannot be rewritten;

an arbitrary variable code being enabled to be written from the exterior into said second storage location and arrangements being made so that said variable code can be rewritten; and there being stored in said memory, a key information generating program that performs a computation process based on a predetermined algorithm using the fixed code stored in said first storage location and the variable code stored in said second storage location to generate encryption key information that is determined uniquely according to said two codes and stores the encryption key information in said third storage location, and a key reading program that reads out the encryption key information stored in said third storage location or a portion of the encryption key information for execution of the encryption process or the decryption process outside the IC card.

(3) The third feature of the present invention resides in an IC card, used for executing an encryption process or a decryption process, having the first or second feature, wherein the key information generating program has a function of generating an encryption key itself, which is used for encryption or decryption, as the encryption key information.

(4) The fourth feature of the present invention resides in an IC card, used for executing an encryption process or a decryption process, having the first or second feature, wherein the key information generating program has a function of generating a key table, a portion of which is used as an encryption key for encryption or decryption, as the encryption key information.

(5) The fifth feature of the present invention resides in an encrypted communication system comprising, a first IC card and a second IC card both storing the same fixed code and being the IC card having any of the first to fourth features;

a transmission means that transmits encrypted text data encrypted using said first IC card; and a reception means that receives said transmitted encrypted text data and provides the encrypted text data for decryption to said second IC card.

(6) The sixth feature of the present invention resides in an encrypted communication method comprising, a preparation step of preparing a first IC card and a second IC card both storing the same fixed code and being the IC card having any of the first to fourth features, and disposing said first IC card at a transmitter side and said second IC card at a receiver side;

an encryption step of performing, at said transmitter side, a process of writing a predetermined variable code into said first IC card to generate encryption key information and using the generated encryption key information to encrypt transmission object data;

a transmitting and communicating step of transmitting, from said transmitter side to said receiver side, said transmission object data that has been encrypted and communicating, from said transmitter side to said receiver side, said variable code; and a decryption step of performing, at said receiver side, a process of writing said variable code, which has been communicated, into said second IC card to make the encryption key information be generated and using the generated encryption key information to decrypt said transmission object data that has been transmitted.

According to the present invention, the encryption key information necessary for the encryption process or the decryption process is generated inside the IC card by a computation process based on the two codes of the fixed code and the variable code that are stored inside the IC card. Here, the fixed code is data that has been written into the IC card in advance and is arranged to be non-rewritable. Thus for example, by writing, into IC cards to be issued to a specific company, the same fixed code unique to the company, the fixed code becomes data stored only in the IC cards owned by company staff of the company and sufficient security measures can thus be taken against an unspecified number of persons outside the company. Meanwhile, since the variable code is a code that can be rewritten freely, flexible accommodation is enabled by rewriting the variable code anew each time a change of member of a project team occurs.

BEST MODE FOR CARRYING OUT THE INVENTION

<<<Section 1. General IC Card Storing Encryption Key Information>>>

Figure 1:
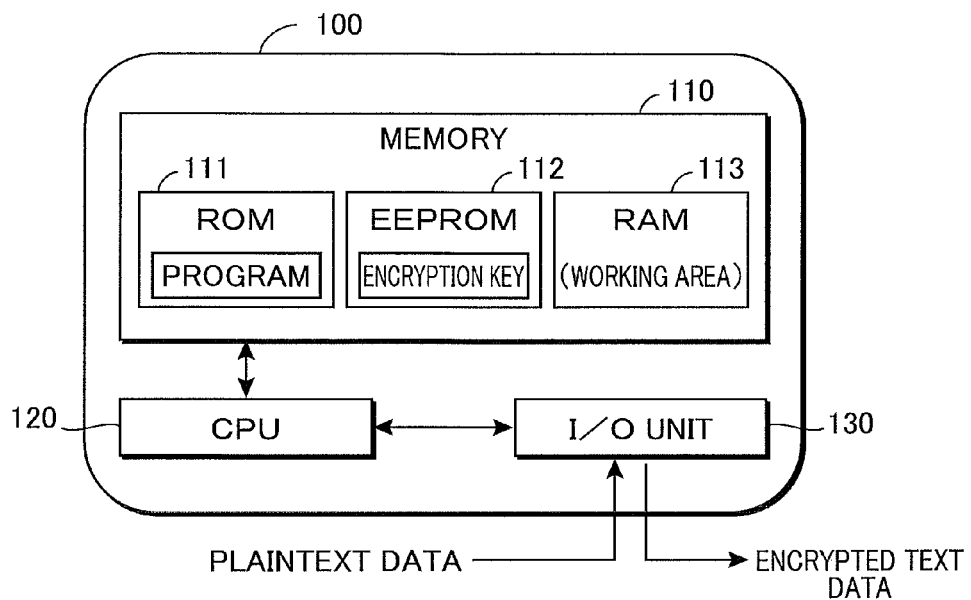
FIG. 1 is a block diagram for describing an arrangement of a general IC card that is widely used presently and an encryption process using this IC card.

An encrypted communication system according to the present invention is a system for performing encrypted communication using IC cards for an encryption or a decryption process. Thus first, an arrangement of a general IC card that stores encryption key information and processes of encryption and decryption using this IC card shall be described briefly. FIG. 1 is a block diagram for describing an arrangement of a general IC card 100, that is widely used presently, and an encryption process using this IC card 100. As illustrated, this IC card 100 has a memory 110, a CPU 120, and an I/O unit 130. In this illustrated example, memory 110 is arranged from a ROM 111, which is a non-rewritable, non-volatile memory, an EEPROM 112, which is a rewritable, nonvolatile memory, and a RAM 113, which is a rewritable, volatile memory. Programs for executing various processing functions that IC card 100 is equipped with are stored in ROM 111, and various data to be recorded in IC card 100 are stored in EEPROM 112. RAM 113 is used as a working area when CPU 120 executes various processes.

Memory 110 is accessible only by CPU 120, and memory 110 cannot be accessed directly from the exterior. Access from the exterior is carried out via I/O unit 130. That is, commands provided from the exterior via I/O unit 130 are executed by CPU 120 based on programs inside ROM 111, and CPU 120 returns execution results as responses to the exterior via I/O unit 130. The illustrated example is an example of an IC card having functions of executing an encryption process of converting plaintext data to encrypted text data and executing an opposite decryption process of converting encrypted text data to plaintext data, with a program for carrying out the encryption and decryption being stored in ROM 111 and an encryption key used by this program being stored in EEPROM 112.

When a predetermined encryption command and plaintext data are provided to IC card 100 via I/O unit 130, CPU 120 executes the provided encryption command based on the program inside ROM 111 and thereby performs a process of applying the predetermined encryption process to the provided plaintext data and outputting the encrypted text data along with a response to the exterior via I/O unit 130. In performing this encryption process, the encryption key stored in EEPROM 112 is used. Oppositely when a predetermined decryption command and encrypted text data are provided to IC card 100 via I/O unit 130, CPU 120 executes the provided decryption command based on the program inside ROM 111 and thereby performs a process of applying the predetermined decryption process to the provided encrypted text data to restore the original plaintext data and outputting the plaintext data along with a response to the exterior via I/O unit 130. The encryption key stored in EEPROM 112 is also used when this decryption process is performed. Here, unless the same key as the encryption key used in the encryption process is used, the plaintext data cannot be restored correctly.

Though an example in which the encryption and decryption program is prepared in ROM 111 was described above, this program may be prepared in EEPROM 112 instead. When the encryption and decryption program is prepared in EEPROM 112, this processing program can be rewritten as necessary. Also, though for the sake of description, IC card 100 having just the encryption and decryption process functions is described here, because IC card 100 is used for various applications, programs for executing the various processes of these various applications are stored in ROM 111 or EEPROM 112 for practical use.

Figure 2:
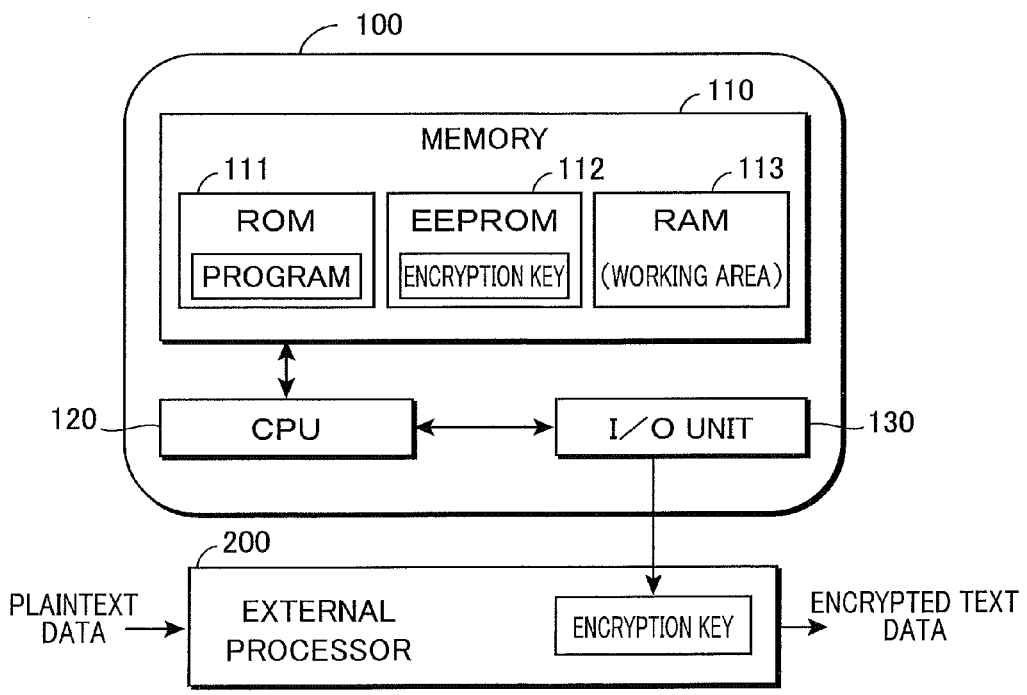
FIG. 2 is a block diagram of an embodiment, with which encryption and decryption processes are carried out not in the interior of an IC card 100 but in an external processor 200.

FIG. 2 is a block diagram of an embodiment, with which the encryption and decryption processes are carried out not in the interior of IC card 100 but in an external processor 200. In this example, when plaintext data is provided to external processor 200, it is converted to and output as encrypted text data, and oppositely when encrypted text is provided, it is converted to and output as plaintext data. In such a case where the encryption and decryption processes are carried out by external processor 200, the encryption key stored in EEPROM 112 is read to external processor 200 via I/O unit 130. The program for encryption and decryption is prepared in external processor 200 and this program executes the encryption and decryption processes using the encryption key read from IC card 100.

Because the encryption key stored in EEPROM 112 is read out to the exterior of IC card 100 with the embodiment shown in FIG. 2, the embodiment of FIG. 1 is better from the standpoint of security. With the embodiment of FIG. 1, because the encryption key stored in EEPROM 112 is not read out to the exterior of IC card 100, the possibility that the encryption key will be made known by an illicit means is extremely low after the encryption key has been stored in EEPROM 112.

Figure 3:
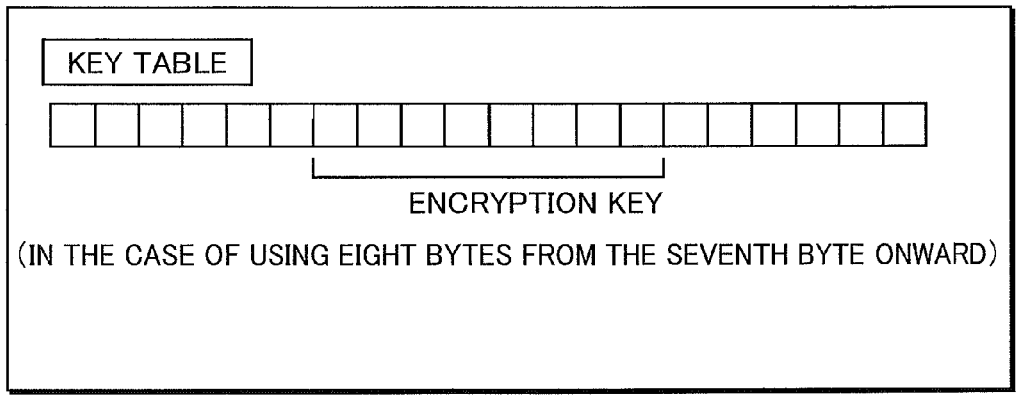
FIG. 3 is a diagram of concepts of a key table used for encryption and decryption processes.

Though an example, in which an encryption process and a decryption process are performed using an encryption key stored in an IC card, is illustrated in FIGS. 1 and 2, for practical purposes, in place of storing the encryption key itself, which is used in the encryption process and the decryption process, in the IC card, an encryption key table may be stored. FIG. 3 is a diagram of concepts of such a key table. In the illustrated example, one grid block indicates one byte of data, and the key table is formed by a data string of a total of 20 bytes. By storing such a key table as encryption key information in an IC card, a desired portion of the key table can be extracted and used as necessary as an encryption key, and the key table can thus be used as an encryption key with a plurality of variations.

For example, if in the encryption process, encryption is executed upon providing an instruction to "use eight bytes from the seventh byte onward as the encryption key," just the designated portion is extracted from the key table as in the illustrated example and used as the encryption key. Because in decrypting data encrypted by such a method, the same instruction to "use eight bytes from the seventh byte onward as the encryption key," which was used in the encryption process, must be provided to specify the encryption key, the security can be improved further.

A portion of the key table shown in FIG. 3 can thus be regarded as being data used as the encryption key for encryption or decryption. Thus in the present application, an encryption key itself and a key table, such as shown in FIG. 3, shall be referred to collectively as "encryption key information."

<<<Section 2. Arrangement of an IC Card According to the Invention>>>

The arrangement of a general IC card used for encryption and decryption was described above in Section 1, and here, an arrangement of an IC card according to the present invention shall be described. A characteristic of the IC card according to the present invention is that it incorporates a key information generating program, which, by performing a computation process based on a predetermined algorithm using two codes, generates encryption key information that is uniquely determined according to the two codes. Concepts of a processing process by this key information generating program shall first be described below.

Figure 4:
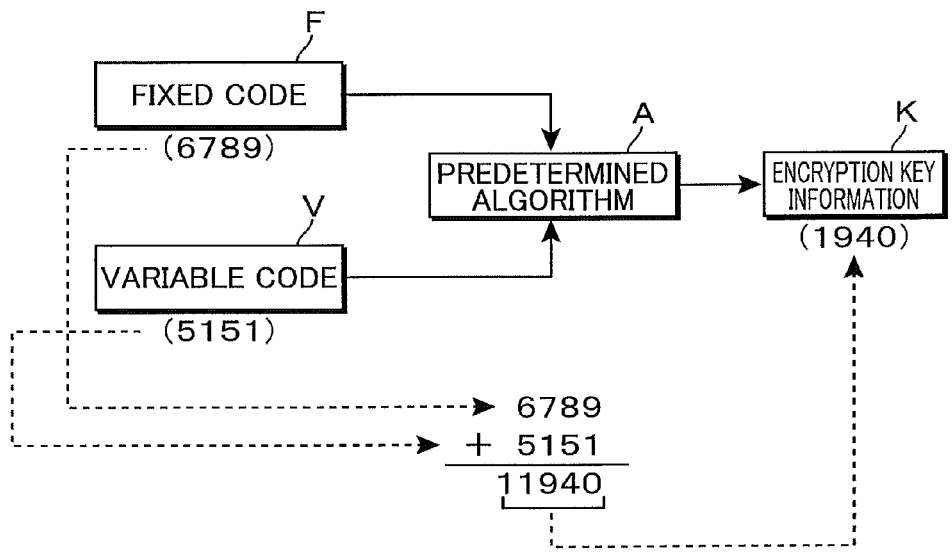
FIG. 4 is a block diagram of a processing process of a key information generating program prepared in an IC card according to the present invention.

FIG. 4 is a block diagram of the processing process of this key information generating program. As illustrated, the key information generating program used in the present invention has a function of executing a computation process based on a predetermined algorithm A using the two pieces of data of a fixed code F and a variable code V to generate encryption key information K. Merits of generating encryption key information K by an algorithm using the two pieces of data of fixed code F and variable code V shall be described later.

Though any algorithm may be used as the predetermined algorithm A, a simple algorithm, in which the sum of fixed code F, which is a four-digit numeral, and variable code V, which is likewise a four digit numeral, is determined and the lower four digits of this sum is used as encryption key information K, is shown as an example in the FIGURE. For example if fixed code F is the numeral, "6789," and variable code V is the numeral, "5151," encryption key information K that is the numeral, "1940," is generated as illustrated. By employing such an algorithm, when the two pieces of data F and V are provided, encryption key information K that is determined uniquely according to these two pieces of data can be generated. By suitably setting the number of digits of fixed code F and the number of digits of variable code V or by employing a specific algorithm as algorithm A, encryption key information K with an arbitrary number of digits can be generated. Encryption key information K, generated by such a method, can thus be used adequately as the above-described key table.

The algorithm for generating encryption key information K is not necessarily restricted to a computation process based on two pieces of data, and as long as at least the two pieces of data of fixed code F and variable code V are used and encryption key information K that is uniquely determined according to these two pieces of data is obtained, the algorithm may be an operation using a third piece of data or a fourth piece of data. In any case, the two codes of fixed code F and variable code V are necessary for obtaining encryption key information K, and encryption key information K cannot be generated with just one of either.

Figure 5:
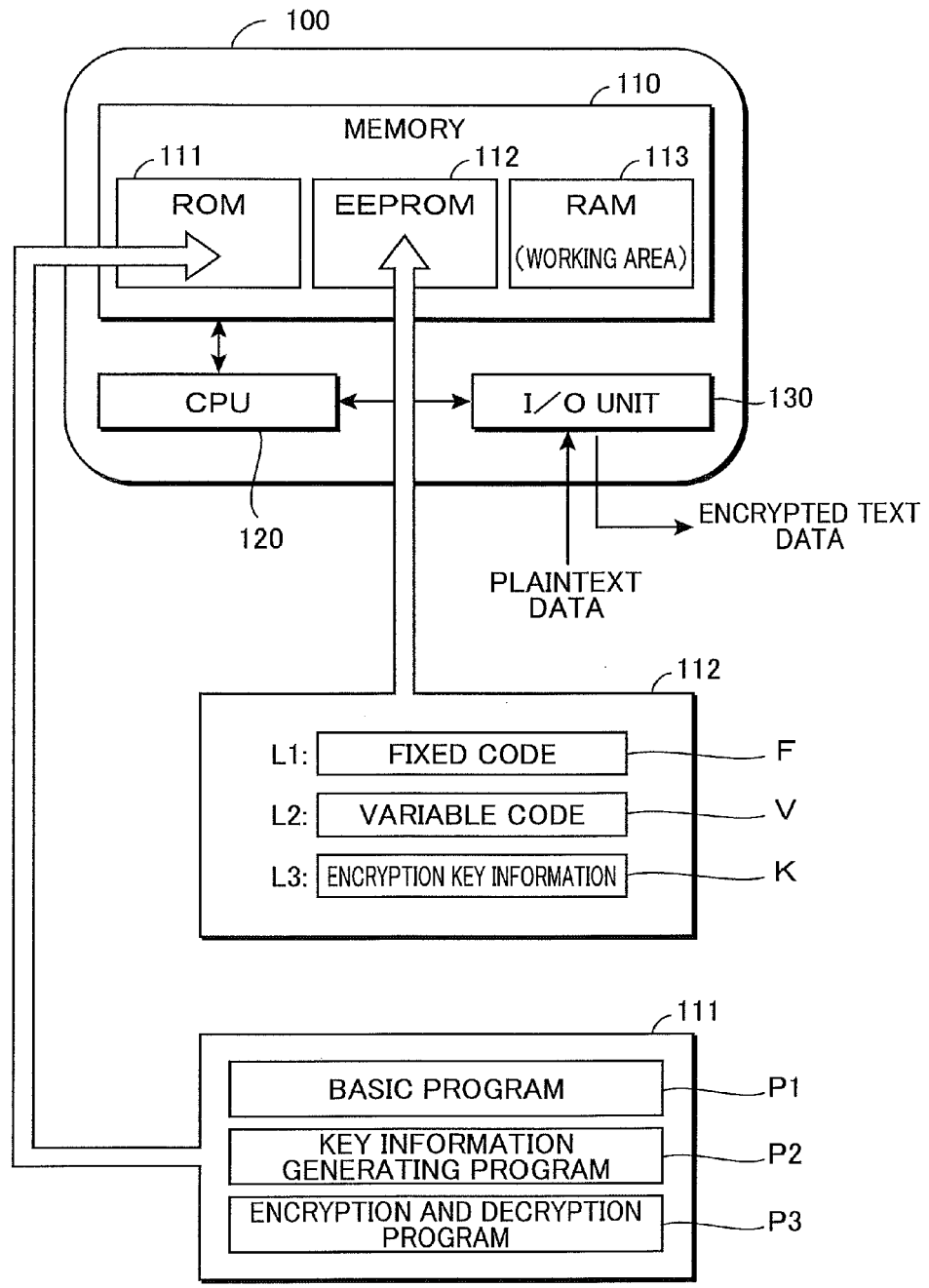
FIG. 5 is a block diagram of a basic arrangement of an IC card according to the present invention.

FIG. 5 is a block diagram of a basic arrangement of IC card 100 according to an embodiment of the present invention. As with the general, conventional IC card described in Section 1, IC card 100, according to the embodiment of FIG. 5, also has memory 110, CPU 120, and I/O unit 130, which performs transaction of information with the exterior, and memory 110 is arranged from ROM 111, EEPROM 112, and RAM 113.

As illustrated, in the present embodiment, a basic program P1, a key information generating program P2, and an encryption and decryption program P3 are stored inside ROM 111, and a first storage location L1, a second storage location L2, and a third storage location L3 are secured inside EEPROM 112. Here, first storage location L1 is a location for storing fixed code F, second storage location L2 is a location for storing variable code V, and third storage location L3 is a location for storing encryption key information K. CPU 12Q executes predetermined processes based on the programs stored in ROM 111 and data stored in EEPROM 112 and RAM 113. As mentioned above, the contents of the processes executed by CPU 120 are determined according to commands provided from the exterior via I/O unit 130, and execution results are output as responses to the exterior.

Fixed code F, variable code V, and encryption key information K, stored in EEPROM 112, correspond to the respective blocks shown in FIG. 4. A purpose of this IC card 100 is to execute the encryption process or the decryption process, and the data necessary for this essential purpose is encryption key information K. Meanwhile, fixed code F and variable code V are data necessary for generating encryption key information K based on the process shown in FIG. 4.

Basic program P1 stored in ROM 111 is a program that is necessary for basic operations of IC card 100 and is a program that is normally incorporated as an OS program for this IC card. In the present embodiment, a process of writing fixed code F into first storage location L1 and a process of writing variable code V into second storage location L2 is executed by this basic program P1. The actual writing task is carried out by performing an operation of providing a predetermined write command and data to be written (fixed code F or variable code V) from the exterior via I/O unit 130.

As shall be described later, whereas variable code V is a code that can be written freely and can be rewritten at any time, fixed code F must be made a code that is fixed and non-rewritable. Here, for a code to be made "fixed and non-rewritable," it is sufficient that the code be fixed and non-rewritable with respect to a user of IC card 100. In other words, because it is sufficient that the rewriting of fixed code F be disabled as long as IC card 100 is under a normal usage environment, a mode of operation is possible in which fixed code F is rewritable if necessary by a manufacturer or a provider.

To disable the rewriting of fixed code F, a means, by which writing into first storage location L1 by a writing command (so called WRITE command) is prohibited under a normal environment, is employed. Specifically, first storage location L1 is secured in a special address area that is managed by an OS, and the OS program has incorporated therein access control that prohibits writing of data into this special address area unless a special procedure, known only to the manufacturer or the provider of the IC card, is performed. Or, arrangements may be made so that a process of writing into this special address area is enabled only once. In any case, arrangements are made so that the process of writing the fixed code into the first storage location is performed by the manufacturer or the provider of the IC card and so that when IC card 100 is placed in the hands of a general user, the predetermined fixed code F is already written in the first storage location.

Meanwhile, key information generating program P2 is a program for generating encryption key information K by executing the process shown in FIG. 4, that is, the process of performing the computation process based on the predetermined algorithm A using fixed code F, stored in first storage location L1, and variable code V, stored in second storage location L2, to generate encryption key information K that is uniquely determined according to the two codes and storing encryption key information K into third storage location L3. In actuality, program P2 is executed by providing a predetermined key information generating command from the exterior via I/O unit 130.

Encryption and decryption program P3 is a program for executing the encryption process or the decryption process inside IC card 100 using encryption key information K stored in third storage location L3. When the encryption process is to be executed by means of this program P3, a command for the encryption process and plaintext data to be subject to encryption are provided from the exterior via I/O unit 130. The encrypted text data generated by the encryption process is output as the response to the exterior via I/O unit 130. Likewise, when the decryption process is to be executed by means of program P3, a command for the decryption process and encrypted text data to be subject to decryption are provided from the exterior via I/O unit 130. The plaintext data generated by decryption process is output as the response to the exterior via I/O unit 130.

Though for the sake of description, an example, in which all of the respective programs P1 to P3 are prepared inside ROM 111, is described as the embodiment shown in FIG. 5, these programs may be prepared in EEPROM 112 instead. Because as mentioned above, IC card 100 is used in various applications, programs for executing the various processes of these various applications are also stored in ROM 111 or EEPROM 112 for practical use. Also, though in regard to data, an example, in which variable code V and encryption key information K are stored in EEPROM 112, is described as the embodiment shown in FIG. 5, if the task of inputting variable code V, the task of generating encryption key information K (execution of program P2), and the processing task of encryption or decryption (execution of program P3) are to be executed in a continuous manner without stopping the supply of power to IC card 100, second storage location L2 for storing variable code V and third storage location L3 for storing encryption key information K may be secured inside RAM 113, which is a volatile memory.

<<<Section 3. Encrypted Communication System According to the Invention>>>

Figure 6:
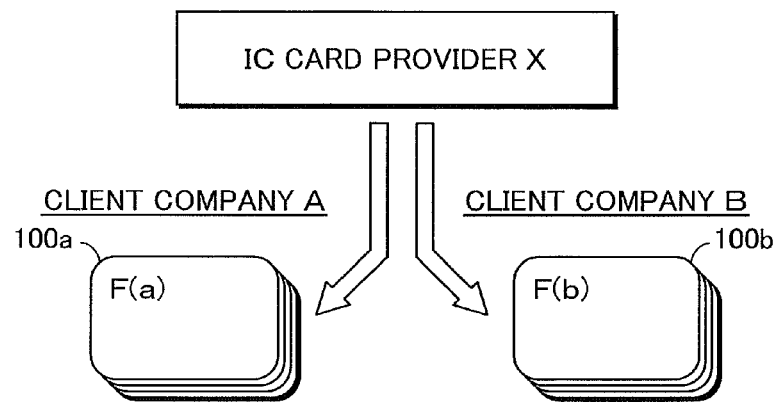
FIG. 6 is a block diagram of an embodiment of issuing of the IC cards according to the present invention.

An example of operation of an encrypted communication system using IC cards 100 described in Section 2 shall now be described. FIG. 6 is a block diagram of an embodiment of issuing of IC cards 100 according to the present invention. In this embodiment, an IC card provider X, commissioned by a client company A and a client company B, issues IC cards respectively to individual company staff belonging to the respective companies.

In this example, first, IC card provider X defines a fixed code F respectively for each company. In the illustrated example, a fixed code F(a) is defined for client company A, and a fixed code F(b) is defined for client company B. These codes F(a) and F(b) may be any codes as long as the codes differ from each other. Also, though not illustrated, if there is a third client company C, a fourth client company D, etc., mutually different fixed codes F(c), F(d), etc., are defined respectively for these companies as well. Each fixed code F is thus a unique code that is provided in common to a single group (a single company in the case of the illustrated example).

Thus in the issuing process shown in FIG. 6, IC card provider X performs a process of writing fixed code F(a) into the IC cards to be delivered to client company A and a process of writing fixed code F(b) into the IC cards to be delivered to client company B. Consequently, all IC cards 100*a*, issued to company staff of company A, have the same fixed code F(a) stored therein, and all IC cards 100*b*, issued to company staff of company B, have the same fixed code F(b) stored therein.

IC card provider X arranges so that IC cards 100*a*, in each of which fixed code F(a) is written, will never be delivered to a party besides company A, and so that IC cards 100*b*, in each of which fixed code F(b) is written, will never be delivered to a party besides company B. By such operation, persons owning IC card 100*a*, in which fixed code F(a) is written, is limited to company staff of company A, and persons owning IC card 100*b*, in which fixed code F(b) is written, is limited to company staff of company B. An encrypted communication system, with which sufficient security is ensured at least with respect to the exterior of each company, can thus be constructed.

An object of the present invention is to provide an encrypted communication system that, in a case where encrypted communication is performed among members belonging to a predetermined group, can accommodate flexibly even for changes of member and yet can ensure sufficient security. A method for constructing an encrypted communication system, by which company staff, who are members of a special project team organized in company A, perform encrypted communication, and for actually performing encrypted communication using this system shall now be described.

Figure 7:
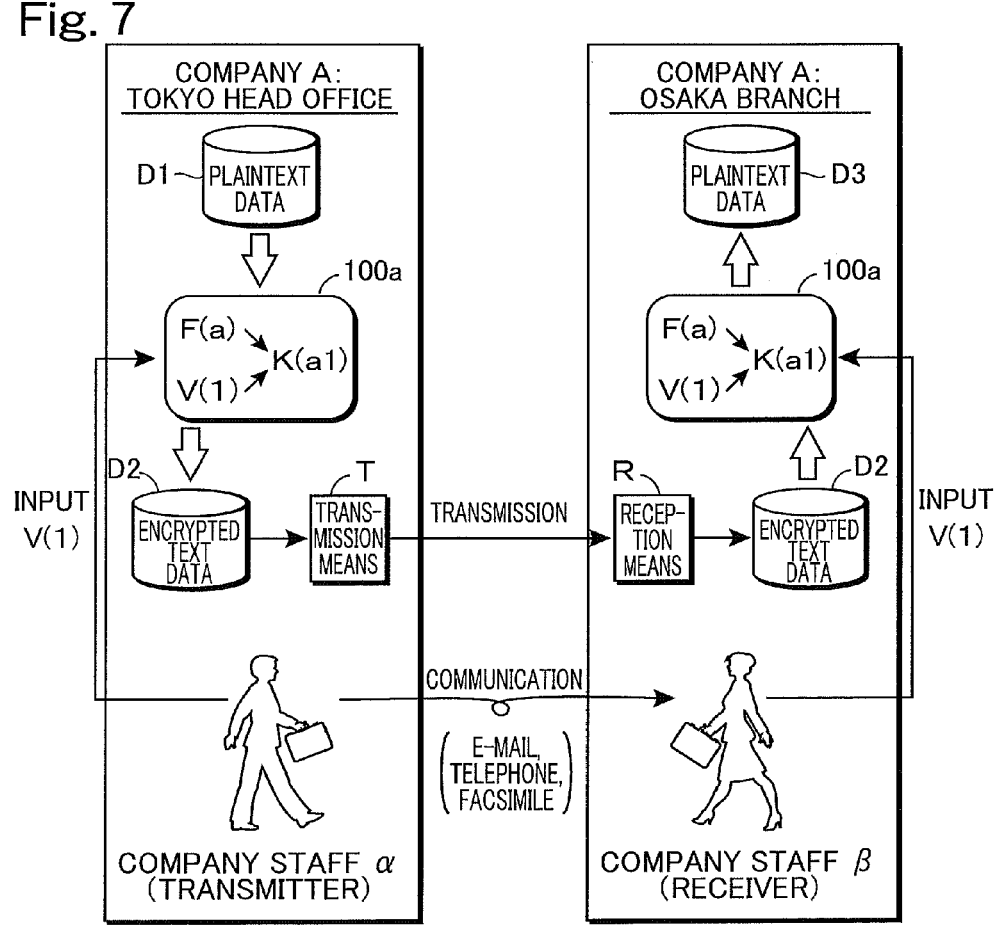
FIG. 7 is a block diagram of an arrangement example of an encrypted communication system according to the present invention.

FIG. 7 is a block diagram of an arrangement example of an encrypted communication system according to the present invention. Here, a case shall be considered where company staff α, employed at a Tokyo head office of company A, and a company staff β, employed at an Osaka branch, are members belonging to a special project team, and encrypted communication according to the present invention is used when predetermined data are transmitted from employee α to employee β. As mentioned in regard to the issuing process shown in FIG. 6, IC cards 100*a* are distributed to the respective company staff of company A. Thus both company staff α and β own IC cards 100*a*, in each of which is stored the same fixed code F(a).

Thus with the encrypted communication method according to the present invention, two IC cards, having the functions described in Section 2 and both storing the same fixed code, must be prepared, with one IC card being disposed at a transmitter side (company staff α) and the other IC card being disposed at a receiver side (company staff β).

A task of writing a predetermined variable code V into the IC card and making encryption key information K be generated is then performed by employee α, who is the transmitter. An example, where employee α inputs a variable code V(1) into his/her own IC card 100*a* and makes encryption key information K(a1) be generated, is shown in the left half of FIG. 7. As mentioned above, the process of writing variable code V(1) into second storage location L2 can be performed by making a writing process function of basic program P1 be executed by the predetermined writing command. The process of making encryption key information K(a1) be generated can be performed by making the key information generating program be executed by a predetermined key information generating command. Encryption key information K(a1) is generated by subjecting fixed code F(a) and variable code V(1) to a computation process based on a predetermined algorithm as shown in FIG. 4. Though variable code V(1) may be any code, it must be managed secretly so that it will not be known to anybody besides members of the project team.

When encryption key information K(a1) is thus generated inside IC card 100*a*, an encryption process using this encryption key information K(a1) is executed to encrypt plaintext D1, which is to be transmitted, and thereby prepare encrypted text data D2. As mentioned above, this encryption process can be carried out by making encryption and decryption program P3 be executed by the predetermined encryption process command.

Company staff α then performs a task of sending the prepared encrypted text data D2 to the Osaka branch via a transmission means T. As illustrated, encrypted text data D2 is transmitted from transmission means T at the Tokyo head office to a reception means R at the Osaka branch. Each of transmission means T and reception means R may be arranged from any type of device as long as the device has general transmission and reception functions. A dedicated line connecting the head office and branches of company A may be used or transmission may be performed using the internet or other public network (for example, as data transmission using FTP or other protocol, transmission as a document attached to E-mail, etc.). Since encrypted text data D2 is encrypted, sufficient security can be ensured during transmission.

Employee α also communicates variable code V(1) to employee β by some means. Specifically, E-mail, telephone, fax, etc., may be used to communicate the code. Obviously, variable code V(1) itself does not have to be communicated necessarily, and as long as it is of a form that can be understood by β, just a hint, from which variable code V(1) can be inferred, may be communicated. For example, if the name of a leader of the project team is used as variable code V(1), it is sufficient to communicate just the information, "leader's name," to β. Or if the same variable code V(1) that was used previously is to be used as it is, it suffices to communicate just the information, "same as before," to β.

Company staff β inputs variable code V(1) that has been communicated thus into his/her own IC card 100*a* and makes encryption key information K(a1) be generated. Encryption key information K(a1) that is thus generated is obviously the same as encryption key information K(a1) generated inside IC card 110*a* at the company staff α side. If variable code V(1) is the same as that used previously, this procedure can be omitted since encryption key information K(a1) will already be stored in IC card 100*a*.

When encryption key information K(a1) is thus prepared inside IC card 100*a*, encrypted text data D2, received by reception means R, is decrypted by executing the decryption process using encryption key information K(a1) to thereby prepare plaintext data D3. As mentioned above, this decryption process can be performed by executing encryption and decryption program P3 by the predetermined decryption process command. The plaintext data D3 will be the same as the original plaintext data D1.

Though an example of performing encrypted transmission from company staff α to company staff β was described above, even if the members of the project team are, for example, the four members of company staff α, β, γ, and δ, encrypted transmission to company staff γ and company staff δ can be performed by the same method. Now suppose that company staff γ is to leave the project team. In this case, it is no longer appropriate to provide company staff γ with the right to decrypt encrypted texts concerning the project team. The encrypted communication system according to the present invention can accommodate appropriately even for such cases. That is, at the point at which company staff γ leaves the team, variable code V(1) is changed to another variable code V(2). Or a mode of operation may be employed in which the variable code is changed each time encrypted communication is performed, with new variable codes being prevented from being notified to company staff γ who has left the team.

Thus by the present invention, when groups are defined to have a hierarchical structure, sufficient security can be ensured among groups of upper rank, and flexible accommodations are enabled even for changes of members in regard to groups of lower rank. With the above-described example, each individual company corresponds to being a group of upper rank. That is, company A and company B are respectively separate groups that are groups of upper rank. Meanwhile, the project team, started up inside company A, can be regarded as being a group of lower rank.

With the present invention, sufficient security can be ensured among groups of upper rank, that is, among the different companies in the above-described example. For example, IC card 100*a*, in which fixed code F(a) is stored, can be obtained only by company staff of company A and cannot be obtained by company staff of company B or other persons in general. Thus even if in the process of communicating variable code V(1) in the example of FIG. 7, variable code V(1) leaks, encrypted text data D2 cannot be deciphered, at least by persons besides company staff of company A. This does mean however that if variable code V(1) is leaked, there is a possibility that encrypted text data D2 will be deciphered by a company staff of company A, even if he/she is a company staff who does not belong to the project team. However, in general, the risks of encrypted texts being deciphered by persons within a company are small in comparison to the risks of encrypted texts being deciphered by persons outside the company.

An aim of the present invention is thus to enable, in a case where groups are defined to have a hierarchical structure, sufficient security to be ensured among groups of upper rank and to enable changes of members to be accommodated flexibly, even if security is lowered somewhat, among groups of lower rank. The IC card that has been described up until now is suited for constructing an encrypted communication system of such an aim.

<<<Section 4. Modification Examples of the Invention>>>

The illustrated basic embodiment of the present invention was described above, and some modification examples of the present invention shall now be described.

(1) Example of Using an Encryption Key Table as the Encryption Key Information

As mentioned in Section 1, instead of using an encryption key itself, a key table, such as that shown in FIG. 3, may be used as encryption key information K stored in third storage location L3 shown in FIG. 5. In this case, the instruction to "use eight bytes from the seventh byte onward as the encryption key" is communicated from the transmitter side to the receiver side along with variable code V.

(2) Performing the Encryption Process or the Decryption Process Externally

Though IC card 100 shown in FIG. 5 is an embodiment used in a case where the encryption process or the decryption process is performed inside the IC card, a case where the encryption process or the decryption process is performed outside IC card 100 as in the embodiment shown in FIG. 2 is also possible. When the present invention is applied to such a case, in place of encryption and decryption program P3 shown in FIG. 5, "a key reading program P4 for reading out the encryption key information (if a key table such as that shown in FIG. 3 is to be used as the encryption key information, a portion of the key table), stored in third storage location L3, to the exterior" is prepared.

(3) Group Arrangement

Though in the embodiments described up until now, one company is handled as one group (a group of the abovementioned upper rank) and the same fixed code F is stored in all IC cards issued to company staff in the same company, a department or a section in the same company can be handled as one group as well. In this case, mutually different fixed codes are allocated according to the departments or sections to which staff belong, even if the departments or sections are those of the same company. Oppositely, a plurality of companies can be handled as a single group as well. In this case, the same fixed code is allocated even if the companies differ.

The invention claimed is:

1. An IC card, used for executing an encryption process or a decryption process using unique encryption key information, said IC card comprising: a memory; a CPU that executes predetermined processes based on data and programs stored in the memory; and an I/O unit that performs transaction of information with an exterior;

a first storage location, a second storage location, and a third storage location being secured inside said memory;

said programs including a basic program, a key information generating program and an encryption and decryption program;

said basic program having a function of carrying out a first process of writing provided data to be written as a non-rewritable fixed code into said first storage location, when a write command with data to be written into said first storage location is provided from the exterior via said I/O unit, and a function of carrying out a second process of writing provided data to be written as a rewritable variable code into said second storage location, when a write command with data to be written into said second storage location is provided from the exterior via said I/O unit;

said key information generating program having a function of carrying out a computation process based on a predetermined algorithm using the non-rewritable fixed code stored in said first storage location and the rewritable variable code stored in said second storage location to generate encryption key information that is determined uniquely according to said non-rewritable fixed code and rewritable variable code and storing the encryption key information in said third storage location, when a key information generating command is provided from the exterior via said I/O unit; and said encryption and decryption program having a function of carrying out an encryption process or a decryption process inside the IC card using the encryption key information stored in said third storage location, when a command for an encryption process or a command for a decryption process is provided from the exterior via I/O unit;

wherein the first process is enabled only once and a predetermined fixed code has already been written in the first storage location as said non-rewritable fixed code by carrying out the first process so as to disable rewriting of said predetermined fixed code in the first storage location.

2. An IC card, used for executing an encryption process or a decryption process using unique encryption key information, said IC card comprising: a memory; a CPU that executes predetermined processes based on data and programs stored in the memory; and an I/O unit that performs transaction of information with an exterior;

a first storage location, a second storage location, and a third storage location being secured inside said memory;

said programs including a basic program, a key information generating program and a key reading program;

said basic program having a function of carrying out a first process of writing provided data to be written as a non-rewritable fixed code into said first storage location, when a write command with data to be written into said first storage location is provided from the exterior via said I/O unit, and a function of carrying out a second process of writing provided data to be written as a rewritable variable code into said second storage location, when a write command with data to be written into said second storage location is provided from the exterior via said I/O unit;

said key information generating program having a function of carrying out a computation process based on a predetermined algorithm using the non-rewritable fixed code stored in said first storage location and the rewritable variable code stored in said second storage location to generate encryption key information that is determined uniquely according to said non-rewritable fixed code and rewritable variable code and storing the encryption key information in said third storage location, when a key information generating command is provided from the exterior via said I/O unit; and said key reading program having a function of reading out the encryption key information stored in said third storage location or a portion of the encryption key information for execution of an encryption process or a decryption process outside the IC card, when a command for an encryption process or a command for a decryption process is provided from the exterior via I/O unit;

wherein the first process is enabled only once and a predetermined fixed code has already been written in the first storage location as said non-rewritable fixed code by carrying out the first process so as to disable rewriting of said predetermined fixed code in the first storage location.

3. The IC card according to claim 1, wherein the key information generating program has a function of generating an encryption key itself, which is used for encryption or decryption, as the encryption key information.

4. The IC card according to claim 1, wherein the key information generating program has a function of generating a key table, a portion of which is used as an encryption key for encryption or decryption, as the encryption key information.

5. An encrypted communication system comprising:
a first IC card and a second IC card, each being the IC card according to claim 1 and both storing a same fixed code;
a transmission means that transmits encrypted text data encrypted using said first IC card; and
a reception means that receives said transmitted encrypted text data and provides the encrypted text data for decryption to said second IC card.

6. An encrypted communication method comprising:
a preparation step of preparing a first IC card and a second IC card, each being the IC card according to claim 1 and both storing a same fixed code, and disposing said first IC card at a transmitter side and said second IC card at a receiver side;
an encryption step of performing, at said transmitter side, a process of writing a predetermined variable code into said first IC card to generate encryption key information and using the generated encryption key information to encrypt transmission object data;
a transmitting and communicating step of transmitting, from said transmitter side to said receiver side, said transmission object data that has been encrypted and communicating, from said transmitter side to said receiver side, said variable code; and
a decryption step of performing, at said receiver side, a process of writing said variable code, which has been communicated, into said second IC card to make the encryption key information be generated and using the generated encryption key information to decrypt said transmission object data that has been transmitted.

7. The IC card according to claim 2, wherein the key information generating program has a function of generating an encryption key itself, which is used for encryption or decryption, as the encryption key information.

8. The IC card according to claim 2, wherein the key information generating program has a function of generating a key table, a portion of which is used as an encryption key for encryption or decryption, as the encryption key information.

9. An encrypted communication system comprising:
a first IC card and a second IC card, each being the IC card according to claim 2 and both storing a same fixed code;
a transmission means that transmits encrypted text data encrypted using said first IC card; and
a reception means that receives said transmitted encrypted text data and provides the encrypted text data for decryption to said second IC card.

10. An encrypted communication method comprising:
a preparation step of preparing a first IC card and a second IC card, each being the IC card according to claim 2 and both storing a same fixed code, and disposing said first IC card at a transmitter side and said second IC card at a receiver side;
an encryption step of performing, at said transmitter side, a process of writing a predetermined variable code into said first IC card to generate encryption key information and using the generated encryption key information to encrypt transmission object data;

a transmitting and communicating step of transmitting, from said transmitter side to said receiver side, said transmission object data that has been encrypted and communicating, from said transmitter side to said receiver side, said variable code; and a decryption step of performing, at said receiver side, a process of writing said variable code, which has been communicated, into said second IC card to make the encryption key information be generated and using the generated encryption key information to decrypt said transmission object data that has been transmitted.

\* \* \* \* \*